United States Patent [19]

Kerko et al.

[11] 4,407,966
[45] Oct. 4, 1983

[54] VERY FAST FADING PHOTOCHROMIC GLASS

[75] Inventors: David J. Kerko; David L. Morse, both of Corning, N.Y.

[73] Assignee: Corning Glass Works, Corning, N.Y.

[21] Appl. No.: 418,971

[22] Filed: Sep. 16, 1982

[51] Int. Cl.$^3$ ............................ C03C 3/26; C03C 3/08
[52] U.S. Cl. ........................................ 501/13; 501/56; 501/61; 501/67
[58] Field of Search ...................... 501/13, 56, 61, 67

[56] References Cited

U.S. PATENT DOCUMENTS

| | | | |
|---|---|---|---|
| 3,208,860 | 9/1965 | Armistead et al. | 501/61 |
| 4,018,965 | 4/1977 | Kerko et al. | 501/13 |
| 4,043,781 | 8/1977 | De Munn et al. | 501/13 |
| 4,130,437 | 12/1978 | Mazeau et al. | 501/13 |
| 4,168,339 | 9/1979 | Kerko et al. | 501/13 |
| 4,190,451 | 2/1980 | Hares et al. | 501/13 |
| 4,290,813 | 9/1981 | Owen et al. | 501/13 |
| 4,358,542 | 11/1982 | Hares et al. | 501/13 |

Primary Examiner—Mark Bell
Attorney, Agent, or Firm—C. S. Janes, Jr.

[57] ABSTRACT

The present invention is directed to the preparation of photochromic glasses exhibiting a darkened luminous transmittance at 40° C. below 35% and a five-minute fading rate at 40° C. of at least 40 units of transmittance and a darkened transmittance at 25° C. below 25% and a five-minute fading rate at 25° C. of at least 35 units of transmittance. The glasses consist essentially, by weight, of:

| | |
|---|---|
| $SiO_2$ | 56–60 |
| $Al_2O_3$ | 6–9 |
| $B_2O_3$ | 18–21 |
| $Li_2O$ | >2.5–3.5 |
| $Na_2O$ | 0.5–2.5 |
| $K_2O$ | 5–7 |
| $ZrO_2$ | 3.75–5 |
| PbO | 0.1–0.15 |
| Ag | >0.15–0.25 |
| Cl | 0.2–0.35 |
| Br | 0.075–0.15 |
| CuO | 0.004–0.02 |
| $CeO_2$ | 0–0.5 | wherein the levels of Ag, Br, Cl, and CuO represent values as analyzed in the glass.

2 Claims, No Drawings

VERY FAST FADING PHOTOCHROMIC GLASS

BACKGROUND OF THE INVENTION

Photochromic or phototropic glasses, i.e., glasses which change color (darken) upon exposure to actinic radiation, customarily ultraviolet radiation, and return to their original state when removed from the radiation, were disclosed almost 20 years ago in United States Patent No. 3,208,860. That patent taught the action of silver halide crystallites, viz., AgCl, AgBr, and AgI, in glass bodies to impart the desired reversible transmission properties thereto. The preferred base glass compositions were stated to be included within the $R_2O$—$Al_2O_3$—$B_2O_3$—$SiO_2$ field and consisted essentially, by weight on the oxide basis, of about 4–26% $Al_2O_3$, 4–26% $B_2O_3$, 40–76% $SiO_2$, and $R_2O$ is selected from the group of 2–8% $Li_2O$, 4–15% $Na_2O$, 6–20% $K_2O$, 8–25% $Rb_2O$, and 10–30% $Cs_2O$, the sum of those components comprising at least 85% of the total composition. With respect to developing photochromic behavior therein, at least one halide is present in a minimum effective amount of 0.2% Cl, 0.1% Br, and 0.08% I and silver is included in at least the aluminum indicated proportions of 0.2% where chloride is the effective halide, 0.05% where bromide is the effective halide, and 0.03% where iodide is the effective halide.

The most prevalent use of photochromic glass up to the present time has been in the fabrication of spectacle lenses, both as prescription lenses and as non-prescription sunglasses. Prescription lenses, marketed under the trademark PHOTOGRAY by Corning Glass Works, Corning, N.Y., constituted the first large volume commercial product. That glass has the following approximate analysis, tabulated in weight percent on the oxide basis:

| | |
|---|---|
| $SiO_2$ | 55.6 |
| $B_2O_3$ | 16.4 |
| $Al_2O_3$ | 8.9 |
| $Li_2O$ | 2.65 |
| $Na_2O$ | 1.85 |
| $K_2O$ | 0.01 |
| BaO | 6.7 |
| CaO | 0.2 |
| PbO | 5.0 |
| $ZrO_2$ | 2.2 |
| Ag | 0.16 |
| CuO | 0.035 |
| Cl | 0.24 |
| Br | 0.145 |
| F | 0.19 |

As can be appreciated, that comparison reflected the need for compromises to be drawn between a number of chemical and physical properties such as glass melting and forming capabilities, glass quality, chemical durability, and ophthalmic requirements, as well as photochromic behavior. Consequently, research has been continuous to devise glass compositions demonstrating improved photochromic properties, while retaining the basic chemical and physical characteristics demanded in a glass designed for the production of ophthalmic products.

One result of that research has been the development of prescription lenses marketed by Corning Glass Works under the trademark PHOTOGRAY EXTRA which darken to a lower luminous transmittance and fade more rapidly than the PHOTOGRAY brand lenses. The glass for those lenses falls within the composition ranges disclosed in U.S. Pat. No. 4,190,451. That patent describes glasses which, in 2 mm cross section, display the following properties:

(a) at a temperature of about 20° C. will darken to a luminous transmittance below 40% in the presence of actinic radiation; will fade at least 30 percentage units of transmittance after five minutes' removal from the actinic radiation; and will fade to a luminous transmittance in excess of 80% in no more than two hours after being removed from the actinic radiation;

(b) at a temperature of about 40° C. will darken to a luminous transmittance below 55% in the presence of actinic radiation; will fade at least 25 percentage units of transmittance after five minutes' removal from the actinic radiation; and will fade to a luminous transmittance in excess of 80% in no more than two hours after being removed from the actinic radiation; and (c) at a temperature of about −18° C. will not darken to a luminous transmittance below 15% in the presence of actinic radiation.

The glasses consist essentially, expressed in terms of weight percent on the oxide basis, of

| | |
|---|---|
| $Li_2O$ | 0–2.5 |
| $Na_2O$ | 0–9 |
| $K_2O$ | 0–17 |
| $Cs_2O$ | 0–6 |
| $Li_2O + Na_2O + K_2O + Cs_2O$ | 8–20 |
| $B_2O_3$ | 14–23 |
| $Al_2O_3$ | 5–25 |
| $P_2O_5$ | 0–25 |
| $SiO_2$ | 20–65 |
| CuO | 0.004–0.02 |
| Ag | 0.15–0.3 |
| Cl | 0.1–0.25 |
| Br | 0.1–0.2 |
| molar ratio alkali metal oxide:$B_2O_3$ | 0.55–0.85 |
| weight ratio Ag:(Cl + Br) | 0.65–0.95 |

Another particular advantage exhibited by those glasses is their relative temperature independence. Hence, in many compositions the photochromic properties vary widely with the ambient temperature. For example, at temperatures of about 40° C. (104° F.) some glasses will darken only a few percentage units; at temperatures of about −18° C. (0° F.) others darken to 5% or less. Such glasses are of little practical utility. The PHOTOGRAY EXTRA brand glasses combine relatively wide swings of darkening and fading with comparatively little temperature dependence.

PHOTOGRAY EXTRA brand lenses have the approximate composition, expressed in terms of weight percent on the oxide basis, of

| | |
|---|---|
| $SiO_2$ | 55.8 |
| $Al_2O_3$ | 6.48 |
| $B_2O_3$ | 18.0 |
| $Li_2O$ | 1.88 |
| $Na_2O$ | 4.04 |
| $K_2O$ | 5.76 |
| $ZrO_2$ | 4.89 |
| $TiO_2$ | 2.17 |
| CuO | 0.011 |
| Ag | 0.24 |
| Cl | 0.20 |
| Br | 0.13 |

PHOTOGRAY and PHOTOGRAY EXTRA lenses have been fabricated in like manner to the process followed in the formation of conventional, i.e., non-photochromic, opthalmic lenses. Thus, a glass blank is pressed and the blank thereafter ground and polished to a predetermined prescription. The glass blank is heat treated in a predefined schedule to develop photochromic properties therein.

U.S. Pat. No. 4,018,965 and 4,130,437 disclosed that non-prescription photochromic lenses, e.g., sunglass lenses, could be prepared without the above-described shaping of prescription lenses via grinding and polishing. Both patents described potentially photochromic glass compositions which are capable of being drawn into glass sheet; the expression potentially photochromic signifying glass which, as drawn into sheet, is virtually non-photochromic but which, after being subjected to an appropriate heat treatment, will evidence photochromic behavior.

The glass compositions disclosed in each patent manifest a viscosity at the liquidus of at least $10^4$ poises, customarily about $10^4$–$10^6$ poises, and display long term stability against devitrification when in contact with platinum metal and high temperature refractory ceramic materials at temperatures responding to glass viscosities in the interval of $10^4$–$10^6$ poises. As defined herein, long term stability against devitrification is deemed to reflect the growth of a layer of crystals no more than 10 microns in thickness at the glass-metal or refractory interface after a 30-day contact. This resistance to crystallization is demanded because the preferred sheet forming practice involves the use of a downdraw fusion pipe such as is described in U.S. Pat. Nos. 3,338,696 and 3,682,609 which may be fabricated from platinum or high temperature refractory ceramic material. Hence, that method, in like manner to other commercially-utilized sheet glass drawing methods, does not impart the very fast quenching action of conventional pressing processes for shaping glass articles. That factor inherently incurs an uncertainty with respect to the feasibility of preparing haze-free, highly-darkening, potentially photochromic glass sheet.

The glasses of each patent have the capacity for being chemically strengthened, when present as sheet in thickness between about 1.3–1.7 mm, to thereby comply with the standards for eyeglass lens safety mandated by the Federal Food and Drug Administration (FDA).

The preferred, potentially photochromic glass compositions of U.S. Pat. No. 4,130,437 can be simultaneously heat treated to effect photochromic properties therein and to sag the glass into molds to produce spectacle lens blanks of the desired curvature, such as is disclosed in U.S. Pat. No. 4,088,470. That capability, coupled with the faculty of being formed into sheet, has permitted the rapid and economical fabrication of sunglass lenses.

The operable ranges of glass compositions delineated in U.S. Pat. Nos. 4,018,965 and 4,130,437 are tabulated below in terms of weight percent on the oxide basis:

|  | U.S. Pat. No. 4,018,965 | U.S. Pat. No. 4,130,437 |
| --- | --- | --- |
| $SiO_2$ | 54–66 | 54–66 |
| $Al_2O_3$ | 7–15 | 7–15 |
| $B_2O_3$ | 10–25 | 10–25 |
| $Li_2O$ | 0.5–4 | 0.5–4 |
| $Na_2O$ | 3.5–15 | 3.5–15 |
| $K_2O$ | 0–10 | 0–10 |
| $Li_2O + Na_2O + K_2O$ | 6–16 | 6–16 |
| PbO | 0–3 | 0–1.25 |
| Ag | 0.1–1 | 0.1–0.3 |
| Cl | 0.1–1 | 0.2–1 |
| Br | 0–3 | 0–0.3 |
| CuO | 0.008–0.16 | 0.002–0.02 |
| F | 0–2.5 | 0–2.5 |

U.S. Pat. No. 4,168,339 is concerned with the production of photochromic glass in the form of microsheet, i.e., sheet glass having thicknesses between about 0.25–0.5 mm. The sheet drawing process employed is again that described in U.S. Pat. Nos. 3,338,696 and 3,682,609, supra, using glasses, expressed in terms of weight percent on the oxide basis, consisting essentially of:

| $SiO_2$ | 54–66 |
| --- | --- |
| $Al_2O_3$ | 7–16 |
| $B_2O_3$ | 10–30 |
| $Na_2O$ | 3–15 |
| $Li_2O$ | 0–4 |
| $K_2O$ | 0–10 |
| PbO | 0.4–1.5 |
| Br | 0.2–0.5 |
| Cl | 0.5–1.2 |
| F | 0.2–0.5 |
| CuO | 0.008–0.03 |
| Ag | >0.03–1 |

U.S. application Ser. No. 252,139, now Pat. No. 4,358,542, filed Apr. 8, 1981 in the names of George B. Hares, David J. Kerko, and David L. Morse under the title PHOTOCHROMIC GLASS SUITABLE FOR MICROSHEET AND SIMULTANEOUS HEAT TREATMENT AND SHAPING, is also directed to the production of photochromic glass in sheet form utilizing the above-described overflow downdraw fusion pipe. Where desired, the glass sheet can be simultaneously heat treated to induce photochromic behavior therein and to sag the glass into molds to form eyeglass lens blanks of the proper curvature.

Operable glasses, expressed in terms of weight percent on the oxide basis, consist essentially of:

| $SiO_2$ | 58.5–60 |
| --- | --- |
| $Al_2O_3$ | 9–10 |
| $B_2O_3$ | 19–20.5 |
| $Li_2O$ | 2–2.5 |
| $Na_2O$ | 2–3 |
| $K_2O$ | 6–7 |
| PbO | 0.1–0.25 |
| Ag | 0.1–0.15 |
| Cl | 0.3–0.5 |
| Br | 0.05–0.15 |
| CuO | 0.0065–0.01 |

With respect to photochromic behavior:

The glasses of U.S. Pat. No. 4,018,965 are stated to exhibit at ambient temperatures, i.e., 20°–25° C., a clear luminous transmittance of at least 60%, a darkened luminous transmittance not exceeding 25%, and a fading rate such that the glass evidences a faded luminous transmittance after a five-minute fading period from the darkened state of at least 1.5 times that of the darkened transmittance;

The glasses of U.S. Pat. No. 4,130,437 are asserted to demonstrate at temperatures of 20°–25° C. a clear luminous transmittance of at least 60%, a darkened luminous transmittance below 30%, a fading rate such that the glass manifests a faded luminous transmittance after a five-minute interval from the darkened state of at least 1.75 times that of the darkened transmittance, and, after a one-hour fading period, the glass evidences a luminous transmittance greater than 80% of its clear luminous transmittance;

The glasses of U.S. Pat. No. 4,168,339 are observed to demonstrate a darkened luminous transmittance at room temperature below 50% and a fading rate such that, after a five-minute fading time, the transmittance will have increased by at least 20 percentage units and, after a one-hour fading interval, the glass will display a luminous transmittance in excess of 80%;

The glasses of Ser. No. 252,139 are noted to exhibit a clear luminous transmittance greater than 65%, a darkened luminous transmittance at 20° C. below 25%, a fading rate at 20° C. such that the glass demonstrates a faded luminous transmittance of at least twice that of the darkened transmittance after a five-minute fading period, a darkened transmittance at 40° C. below 45%, and a fading rate at 40° C. such that the glass displays a faded luminous transmittance of at least 1.75 times that of the darkened transmittance after a five-minute fading interval.

It will be appreciated that the initial clear luminous transmittance levels of the glasses described in each of the above disclosures are in the vicinity of 90%. Various tinting agents such as transition metal oxides, e.g., CoO, $Cr_2O_3$, $Fe_2O_3$, $MnO_2$, NiO, and $V_2O_5$, and/or rare earth oxides, e.g., $Er_2O_3$, $Ho_2O_3$, $Nd_2O_3$, and $Pr_2O_3$, are added to the base glass composition to reduce the initial clear luminous transmittance values to levels approaching 60%. Inasmuch as the amount of tinting agent employed is so small, the overall photochromic properties of the glass are not significantly affected by such additions.

Although the photochromic properties of the above-cited glasses constitute substantial improvements upon the first marketed PHOTOGRAY brand lenses, the desire for even greater darkening and more rapid fading is ever present. And, as has been emphasized above, the search for such improved photochromic behavior must also lead to a glass exhibiting chemical and physical characteristics inherent in conventional ophthalmic lenses such that it can be produced, marketed, and used by the wearer in customary fashion. Those characteristics include the need to be chemically strengthenable to comply with the FDA standards for eyeglass lens safety and, in the case of prescription lenses, to have the proper refractive index.

SUMMARY OF THE INVENTION

We have produced photochromic glasses demonstrating an initial luminous transmittance of about 90% (where no tinting agents are incorporated), a transmittance after exposure to actinic radiation (ultraviolet radiation) at room temperature (~25° C.) in 1.5-2 mm thickness of less than 25%, a fading rate at room temperature such that after five minutes the transmittance will have increased at least 35 percentage units and, in certain instances, up to 50 percentage units. At 40° C. in 1.5-2 mm thickness, the glass will demonstrate darkening upon exposure to actinic radiation to a luminous transmittance of less than 35%, sometimes less than 30%, and a fading rate such that after five minutes the transmittance will have increased at least 40 percentage units, frequently in excess of 50 percentage units. At 0° C. in 1.5-2 mm thickness, the glass will exhibit a luminous transmittance, upon being exposed to actinic radiation, greater than 15% and, in certain compositions, in excess of 20%.

When the inventive glasses are subjected to chemical strengthening techniques, modulus of rupture values in excess of 30,000 psi are achieved and levels in excess of 35,000 psi have been measured.

We had observed in composition research attempts to further improve the photochromic properties of PHOTOGRAY EXTRA lenses that increasing the $Li_2O$ content thereof, i.e., to levels in excess of 2.5% by weight and, preferably greater than 2.75% by weight, sharply enhanced the fading rate but, unfortunately, concomitantly therewith also seriously degraded the darkening capability of the glass. The improved photochromic behavior of our inventive glasses is derived from our discovery that the inclusion of about 0.1-0.15% by weight PbO in the glasses containing higher $Li_2O$ contents can restore and may even improve upon the darkening faculty of the glass, while permitting the more rapid fading rate imparted by the higher $Li_2O$ content to be maintained.

Thus, where PbO is not included in the composition, the fading rate of the glass is very fast but is is difficult to achieve a darkened luminous transmittance therein below about 50%. Excessive amounts of PbO should be avoided, however, for the following two reasons:

(a) the color of the glass in the darkened state is shifted from a neutral gray to undesirable red-to-purple tints; and (b) the fade rate of the glass is severely reduced.

As can be appreciated, to develop a glass demonstrating the necessary melting and forming behavior along with the chemical and physical properties demanded in opthalmic lenses, various modifications must be undertaken in the other base glass components, particularly in the contents of the other alkali metal oxides. Thus, we have found it to be mandatory to maintain an "alkali balance" in the base glass. For example, in the base glasses utilized in the PHOTOGRAY EXTRA lenses, each of the $Li_2O$, $Na_2O$, and $K_2O$ contents will be present in about a 6 cation percent level with the total of the three constituents in the vicinity of 18 cation percent.

In contrast, the inventive glasses contain up to about 3.5% by weight $Li_2O$ which, when combined in the base glass formulations approximating that employed in PHOTOGRAY EXTRA lenses, translates into a cation percent level of about 8.5-10.5. Melt devitrification becomes a problem at $Li_2O$ values exceeding about 3.5% by weight. Because $K_2O$ is more efficient than $Na_2O$ in promoting effective silver halide crystallite development in the glass, thereby contributing to higher levels of glass darkening, as the content of $Li_2O$ is increased the amount of $Na_2O$ will generally be decreased. Accordingly, the inventive compositions will contain about 0.5-2.5% by weight $Na_2O$, i.e., about 0.75-3 cation percent. The $K_2O$ content will range between about 5-7% by weight which approximates 5.5-6.5 cation percent.

In summary, the glasses of the instant invention consist essentially, expressed in terms of weight percent on the oxide basis, with the levels of the "photochromic elements", i.e., Ag, Cl, Br, and CuO, being as analyzed in the glass, of:

| | |
|---|---|
| $SiO_2$ | 56-60 |
| $B_2O_3$ | 18-21 |

-continued

| | |
|---|---|
| Al$_2$O$_3$ | 6–9 |
| Li$_2$O | >2.5–3.5 |
| Na$_2$O | 0.5–2.5 |
| K$_2$O | 5–7 |
| ZrO$_2$ | 3.75–5 |
| TiO$_2$ | 0–3 |
| PbO | 0.1–0.15 |
| Ag | >0.15–0.25 |
| Cl | 0.2–0.35 |
| Br | 0.075–0.15 |
| CuO | 0.004–0.02 |

The index of refraction of the glasses is commonly adjusted through the presence of ZrO$_2$ with or without TiO$_2$. It will be recognized that, where desired, conventional glass coloring agents may be included in the glass compositions in conventional amounts to impart a tint. However, so little tinting agent is required that the photochromic behavior of the glass is not basically affected. Finally, up to 0.5% CeO$_2$ may be incorporated in the composition to reduce the transmission in the near ultraviolet portion of the radiation spectrum.

The method for forming glass articles demonstrating the desired photochromic behavior comprises three general steps:

(1) a glass-forming batch of the proper composition is melted;

(2) the melt is simultaneously cooled and a glass article of a desired geometry is shaped therefrom; and then (3) the glass article is exposed to a temperature between about 650°–675° C. for a sufficient period of time to develop photochromic properties therein.

DESCRIPTION OF PREFERRED EMBODIMENTS

Table I reports a group of glasses, expressed in terms of parts by weight on the oxide basis, illustrating the compositional parameters of the instant invention. Inasmuch as the sum of the individual components closely approximates 100, for all practical purposes each value tabulated may be deemed to reflect weight percent. Because it is not known with which cation(s) the halides are combined, they are merely recorded in terms of the individual halides, in accordance with conventional glass analysis practice. Finally, since the levels of silver are so low, they also are simply recited as metallic silver. The value in parentheses indicates analyzed levels of a particular ingredient as measured via X-ray fluorescence. Volatilization of the base glass ingredients is deemed to be essentially negligible.

The batch materials were compounded, ballmilled together to assist in achieving a homogeneous melt, and then fed into a laboratory scale, continuous melting unit operating at about 1400°–1450° C. Lens blanks were pressed therefrom and immediately transferred to a lehr operating at 425° C.

TABLE I

| | 1 | 2 | 3 | 4 | 5 | 6 | 7 |
|---|---|---|---|---|---|---|---|
| SiO$_2$ | 58.9 | 58.9 | 58.9 | 58.0 | 58.0 | 58.0 | 58.9 |
| B$_2$O$_3$ | 19.8 | 19.8 | 19.3 | 19.3 | 19.3 | 19.3 | 20.0 |
| Al$_2$O$_3$ | 7.12 | 7.12 | 7.17 | 7.02 | 7.02 | 7.02 | 7.17 |
| Li$_2$O | 3.12 | 3.12 | 3.12 | 1.85 | 2.16 | 2.79 | 3.12 |
| Na$_2$O | 0.909 | 0.909 | 0.78 | 3.50 | 2.88 | 1.61 | 0.78 |
| K$_2$O | 5.90 | 5.90 | 5.89 | 6.20 | 6.20 | 6.20 | 5.89 |
| ZrO$_2$ | 3.86 | 3.86 | 3.86 | 3.79 | 3.79 | 3.79 | 3.86 |
| PbO | 0.122 | 0.122 | 0.120 | 0.12 | 0.12 | 0.12 | — |
| | (0.12) | (0.12) | (0.12) | (0.12) | (0.12) | (0.12) | |
| Ag | 0.223 | 0.223 | 0.200 | 0.208 | 0.208 | 0.208 | 0.200 |
| | (0.20) | (0.20) | (0.175) | (0.195) | (0.195) | (0.195) | (0.175) |
| Cl | 0.306 | 0.29 | 0.300 | 0.305 | 0.305 | 0.305 | 0.300 |
| | (0.29) | (0.25) | (0.24) | (0.26) | (0.29) | (0.30) | (0.24) |
| Br | 0.125 | 0.125 | 0.154 | 0.123 | 0.123 | 0.123 | 0.154 |
| | (0.09) | (0.10) | (0.09) | (0.10) | (0.10) | (0.10) | (0.09) |
| CuO | 0.006 | 0.006 | 0.008 | 0.012 | 0.012 | 0.012 | 0.008 |
| | (0.006) | (0.006) | (0.011) | (0.012) | (0.012) | (0.012) | (0.011) |

The blanks were exposed to the heat treatment schedules reported in Table II to develop photochromic properties therein, subsequently ground and polished to a thickness of about 1.5–2 mm, and then subjected to the chemical strengthening technique customarily utilized with PHOTOGRAY EXTRA lenses, viz., immersion for 16 hours into a bath of molten salt consisting of 60% by weight KNO$_3$ and 40% by weight NaNO$_3$ operating at 400° C. After removal from the bath, the specimens were cooled, the salt clinging thereto was rinsed off with tap water, and measurements of strength and photochromic behavior were conducted.

Modulus of rupture values in excess of 35,000 psi were determined utilizing measuring techniques conventional in the glass art. Surface compression layers having thicknesses in excess of 0.030" were observed employing a polarizing microscope with a Babinet compensator.

Whereas the inventive photochromic glass is primarily activated via radiation from the ultaviolet and short visible portions of the spectrum, experience has manifested that often the correlation between test data obtained using an ultraviolet lamp and levels measured with solar radiation outdoors was poor. Therefore, to secure better correlation with outdoor solar exposure, a "solar simulator" was developed.

The solar simulator apparatus described in U.S. Pat. No. 4,125,775 employs a 150 watt xenon arc source fitted with a filter to modify the spectral output thereof to closely approximate the radiation spectrum of the sun, especially in the ultraviolet, blue, and red portions. The infrared regime of the spectrum is attenuated with a layer of water of sufficient thickness to provide equal irradiance to that of the sun, but with no special regard for the spectral distribution within that region.

The intensity of the arc source was adjusted such that the level of darkening was identical to that of several commercially available photochromic glasses, including PHOTOGRAY lens blanks, darkened outdoors at noon during a cloudless summer day in Corning, N.Y. (air mass value of about 1.06). Numerous experimental photochromic glasses of widely-varying compositions were also subjected to the solar simulator and to outdoor sunlight. Excellent overall agreement was observed when the data were compared.

Continuous monitoring of the darkened transmittance displayed by the samples was secured by interrogating each with a chopped beam of light from a tungsten-halogen lamp detected by a PIN silicon photodiode whose output was demodulated by a lock-in amplifier. A composite color filter was placed into the beam to approximate the response of the human eye under Illuminant C, as defined by C.I.E.

The apparatus was interfaced to a PDP-11/04 computer (marketed by Digital Equipment Corporation, Maynard, Mass.) to enable automatic sample change, temperature selection, event sequencing, and data collection, storage, reduction, and retrieval with a minimum of operator's involvement.

As employed in the present context, the luminous transmittance of a glass is defined as the value Y delineated in terms of the 1931 C.I.E. trichomatic colorimetric system utilizing the light source Illuminant C. This colorimetric system and light source are described by A. C. Hardy in the *Handbook of Colorimetry*, Technology Press, M.I.T., Cambridge, Mass. (1936).

Table II lists the thickness of the samples, the temperatures at which the samples were exposed, $T_o$ indicates the initial transmittance of the samples prior to exposure to the solar simulator, $T_{D10}$ delineates the transmittance of the samples after a 10-minute exposure to the solar simulator, and $\Delta T_{F5}$ designates the units of transmittance faded by the samples five minutes after removal of the samples from exposure in the solar simulator. Table II also reports similar data and measurements determined on samples of PHOTOGRAY EXTRA lenses.

A comparison of Examples 4, 5, and PHOTOGRAY EXTRA lenses with Examples 1–3 and 6 illustrates the effect of Li$_2$O on the photochromic behavior of the glass. Example 7, being free from PbO, does not darken to the extent desired but exhibits very rapid fading. Example 3 is our most preferred composition.

We claim:

1. A photochromic glass composition consisting essentially, expressed in terms of weight percent on the oxide basis, with the levels of Ag, Br, Cl, and CuO representing values as analyzed in the glass, of

| | |
|---|---|
| SiO$_2$ | 56–60 |
| Al$_2$O$_3$ | 6–9 |
| B$_2$O$_3$ | 18–21 |
| Li$_2$O | >2.5–3.5 |
| Na$_2$O | 0.5–2.5 |
| K$_2$O | 5–7 |
| ZrO$_2$ | 3.75–5 |
| PbO | 0.1–0.15 |
| Ag | >0.15–0.25 |
| Cl | 0.2–0.35 |
| Br | 0.075–0.15 |
| CuO | 0.004–0.02 |
| CeO$_2$ | 0–0.5 | capable of being chemically strengthened to modulus of rupture values in excess of 35,000 psi with a depth of compression layer of at least 0.030 inch and demonstrating the following photochromic properties when present in cross section of about 1.5–3 mm;

(a) a clear luminous transmittance of approximately 90% when free from added tint;

(b) a darkened luminous transmittance at 40° C. below 35% when the glass is free from added tint and a fading rate at 40° C. such that after five minutes the luminous transmittance will have increased at least 40 percentage units;

(b) a darkened luminous transmittance at 25° C. below 25% when the glass is free from added tint and a fading rate at 25° C. such that after five minutes the luminous transmittance will have increased at least 35 percentage units; and (c) a darkened luminous transmittance at 0° C. greater than 15%.

TABLE II

| Example | Thickness | Exposure Temperature | $T_o$ | $T_{D10}$ | $\Delta T_{F5}$ | Heat Treatment |
|---|---|---|---|---|---|---|
| 1 | 1.5 mm | 40° C. | 90.5 | 31.0 | 52.3 | 660° C. for 15 minutes |
| 1 | 1.5 mm | 25° C. | 90.6 | 20.5 | 36.1 | 660° C. for 15 minutes |
| 1 | 1.5 mm | 19° C. | 90.8 | 18.9 | 31.8 | 660° C. for 15 minutes |
| 1 | 1.5 mm | 0° C. | 91.0 | 17.7 | 4.2 | 660° C. for 15 minutes |
| 2 | 1.5 mm | 40° C. | 91.1 | 33.4 | 51.4 | 660° C. for 15 minutes |
| 2 | 1.5 mm | 25° C. | 91.2 | 22.9 | 39.0 | 660° C. for 15 minutes |
| 2 | 1.5 mm | 19° C. | 91.3 | 21.2 | 35.4 | 660° C. for 15 minutes |
| 2 | 1.5 mm | 0° C. | 91.5 | 19.8 | 4.9 | 660° C. for 15 minutes |
| 3 | 2 mm | 40° C. | 90.3 | 33.1 | 43.5 | 660° C. for 30 minutes |
| 3 | 2 mm | 25° C. | 90.0 | 22.8 | 49.9 | 660° C. for 30 minutes |
| 3 | 2 mm | 20° C. | 89.9 | 17.8 | 40.6 | 660° C. for 30 minutes |
| 4 | 1.5 mm | 40° C. | 91.3 | 47.3 | 36.4 | 550° C. for 10 minutes + |
| 4 | 1.5 mm | 26° C. | 91.3 | 28.5 | 43.3 | 660° C. for 15 minutes + |
| 4 | 1.5 mm | 20° C. | 91.4 | 22.7 | 40.6 | 425° C. for 16 hours |
| 5 | 1.5 mm | 40° C. | 92.0 | 39.4 | 42.1 | 550° C. for 10 minutes + |
| 5 | 1.5 mm | 26° C. | 92.0 | 22.0 | 42.5 | 660° C. for 15 minutes + |
| 5 | 1.5 mm | 20° C. | 92.0 | 17.9 | 35.7 | 425° C. for 16 hours |
| 6 | 1.5 mm | 40° C. | 91.0 | 31.7 | 50.0 | 550° C. for 10 minutes + |
| 6 | 1.5 mm | 26° C. | 90.9 | 24.8 | 38.4 | 660° C. for 15 minutes + |
| 6 | 1.5 mm | 20° C. | 91.0 | 22.8 | 36.3 | 425° C. for 16 hours |
| 7 | 2 mm | 40° C. | 90.3 | 40.0 | 47.0 | 660° C. for 30 minutes |
| 7 | 2 mm | 25° C. | 90.0 | 29.0 | 50.0 | 660° C. for 30 minutes |
| 7 | 2 mm | 20° C. | 89.9 | 20.0 | 42.0 | 660° C. for 30 minutes |
| EXTRA | 2 mm | 40° C. | 90.0 | 39.0 | 38.5 | 660° C. for 30 minutes |
| EXTRA | 2 mm | 25° C. | 90.0 | 26.5 | 37.5 | 660° C. for 30 minutes |

2. A photochromic glass according to claim 1 having the following approximate composition:

| | |
|---|---|
| SiO$_2$ | 58.9 |
| B$_2$O$_3$ | 20.0 |
| Al$_2$O$_3$ | 7.17 |
| Li$_2$O | 3.12 |
| Na$_2$O | 0.78 |
| K$_2$O | 5.89 |
| ZrO$_2$ | 3.86 |
| PbO | 0.12 |
| Ag | 0.175 |
| Cl | 0.24 |
| Br | 0.09 |
| CuO | 0.011 |

* * * * *